United States Patent [19]
Stillman et al.

[11] 3,864,571
[45] Feb. 4, 1975

[54] METHOD AND APPARATUS FOR AUTOMATICALLY, IDENTIFYING AND COUNTING VARIOUS CELLS IN BODY FLUIDS

[75] Inventors: Irving M. Stillman, Columbia; Neil M. Trowe; Jules R. Clemens, both of Potomac, all of Md.

[73] Assignee: Wheeler International, Inc., Washington, D.C.

[22] Filed: Feb. 10, 1971

[21] Appl. No.: 114,297

[52] U.S. Cl. .................. 250/302, 250/304, 250/373
[51] Int. Cl. .......................................... G01n 21/26
[58] Field of Search .......... 250/71 R, 83.3 UV, 208, 250/211 R, 237 R, 304, 302, 373; 235/92 PC

[56] References Cited
UNITED STATES PATENTS

| | | | |
|---|---|---|---|
| 3,413,464 | 11/1968 | Kamentsky | 250/833 UV X |
| 3,437,823 | 4/1969 | Joyce | 250/237 R X |
| 3,487,227 | 12/1969 | Kinzly | 250/237 R |
| 3,497,690 | 2/1970 | Wheeless, Jr. et al. | 250/83.3 UV X |
| 3,515,884 | 6/1970 | Imadate | 250/218 |
| 3,549,994 | 12/1970 | Rothermel et al. | 235/92 PC X |
| 3,578,979 | 5/1971 | Kawaguchi et al. | 250/211 R X |
| 3,699,336 | 10/1972 | Ehrlich et al. | 250/373 |

*Primary Examiner*—Archie R. Brochelt
*Attorney, Agent, or Firm*—Cantor and Kraft

[57] ABSTRACT

The various types of cells in body fluids are automatically identified by measuring the area of each cell that is occupied by nucleus and cytoplasm and automatically comparing these measurements to each other and also to the total cell area. In the preferred embodiment, the fluid containing the cells is treated with a stain capable of fluorescing when complexed and then excited by an ultraviolet source. The nuclear and cytoplasmic portions of each corpuscle will fluoresce with a radiation characteristic of the type of material. The sample to be counted is caused to flow past a counting station which is in the same plane as the source of ultraviolet radiation and the measurements are taken from the secondary fluorescent emissions of these materials. This information is fed to logic circuits and ultimately to counters which output the results.

43 Claims, 19 Drawing Figures

INVENTORS,
IRVING M. STILLMAN
NEIL M. TROWE
JULES R. CLEMENS

INVENTORS,
IRVING M. STILLMAN
NEIL M. TROWE
JULES R. CLEMENS

INVENTORS,
IRVING. M. STILLMAN
NEIL M. TROWE
JULES R. CLEMENS

METHOD AND APPARATUS FOR AUTOMATICALLY, IDENTIFYING AND COUNTING VARIOUS CELLS IN BODY FLUIDS

BACKGROUND OF THE INVENTION

A. Field of the Invention

In recent years medical science, bioengineering and pathology in particular have made rapid strides in automating and mechanizing both physiological and pathological testing procedures. Two approaches have been taken by workers in this field. The first approach is to mechanize the manual operations performed by technicians and pathologists; in effect duplicating, with relatively sophisticated machinery, the manipulative operations and procedures performed by the technicians. The second approach relies for its basis upon utilization of newly emerging fields of technology such as microelectronics, solid state photocells, computer technology, etc. to permit the measurement of lesser known and formerly unused parameters.

This invention is of the second type in that it uses a totally different concept to that employed by pathologists and hematologists presently to determine both the type, quantity, and relative percentages of the various cells in a sample of body fluid. The inventive device and method when testing a fluid sample of blood will automatically identify each type of white blood cell as well as give accurate counts of each of the lymphocytes, polymorphonuclear neutrophils, eosinophils, monocytes, and basophils (the five basic types of leukocytes or white blood cells) and as a bonus will give a blood platelet count as well as count of reticulocytes (juvenile red cells).

Changes in the total number of leukocytes and in their relative proportions are of considerable significance to a clinician since they are measures of the reaction of the body to noxious agents. In many cases the changes in the quantities of specific leukocytes will enable the causing agent to be identified. Thus it has become increasingly important to be able to make rapid, accurate body fluid tests especially for white cells in blood. While generally accepted methods have been derived to give hematrocrit, hemoglobin and total leukocyte counts in a rapid and reasonably accurate semi-automated manner, the method for identifying and performing an accurate count of each of the various types of leukocytes has largely remained a manual technique.

B. Description of the Prior Art

According to present techniques for making counts of each of the leukocytes, a blood film is prepared on a microscope slide using a drop of fresh whole blood. The specimen is stained with Wright's stain and dried for viewing under a microscope. The various types of leukocytes present different appearances when illuminated by white light and viewed under a microscope and accordingly a trained technician is able to make an individual count of each cell type by visual identification of the various leukocytes. Normally, a total of 100 leukocytes in a drop of fluid taken from a larger sample drawn from the patient are counted in this manner and the quantity of each type of cell counted is reported as a percentage of the total of 100 cells counted even though the normal cell count is 4,000 to 11,000 cells per cubic millimeter. Assuming that the drop of fluid placed on the slide to make the smear is of a uniform size, it is imperative that the prepared smear be made in such a way that there is a feathering of the smear down to one cell thickness. Care must be taken to assure that the smear is made without the fluid reaching the edge of the slide. If this does occur, the large cells will be concentrated at the edge of the smear and the smaller cells will be concentrated in the middle of the smear. An accurate count on a smear of this type is difficult. In the staining technique itself, there are also many errors which can occur. One of the most common errors is in using a buffer for the staining which is either too alkaline or too acid; the buffer and stain mixture must be neutral. If the buffer is either too acid or too alkaline, the possibility of determining the morphology (structure) of the leukocyte is greatly reduced because of the non-uniform staining of the nucleus. This manual method requires about 15 minutes and is subject to many other errors so that even when performed by an experienced skilled pathologist the resulting count is accurate only to within plus or minus 25 percent.

Several attempts have been made to automate this operation. The first attempt was made by Edward T. Smithline and is disclosed in U.S. Pat. No. 3,315,229 assigned to International Business Machines. The approach taken by Mr. Smithline was a classical mechanistic one. He has replaced the technician with a sophisticated electronic-optical system that determines the outline or total periphery of each type of cell as well as the internal characteristics of the cell under white light by scanning a slide prepared, essentially, as though a manual count were to be made. These structures are then compared to each other by computer logic circuits to identify the type of cells; in effect this technique mechanizes the operations manually performed by the technician and because of the technological limitations of the equipment is only useful in a mass screening operation.

The second approach known to the art is the "Technicon" process which makes use of the light absorption characteristics of the cells. In this process the blood is forced through four separate channels in a continuous flow system. In each of the channels a different dye is inserted. This dye is picked up by the individual cells and the amount of light transmitted through the cells is compared to the amount of light that would pass through pure ethylene glycol. In this manner it is possible to identify most of the leukocytes with the exception of the lymphocytes for which a separate testing procedure is used. The neutrophils are further distinguished from the eosinophil by testing their relative acidity. In order to report the leukocyte count in a usable form, this process counts a total of 10,000 cells and reports all leukocytes, by type, expressed in percentages. Both of these apparatus are expensive and complicated when compared to the present manual method. Their main utility being higher capacity and faster speed of testing.

A prior method has been used employing the fluoresence from cells which have been subjected to a source of ultraviolet radiation to automatically identify and count the various white cells in a sample of fluid. This method by one of the present inventors (see Application Ser. No. 66,560 filed Aug. 24, 1970 by Neil M. Trowe, and commonly assigned) was based upon an entirely different operative concept, in which it is assumed that each type of white cell would autofluoresce with a characteristic color and on this basis the leukocytes could be readily differentiated by an automated apparatus.

SUMMARY OF THE INVENTION

The present invention is directed to a process and apparatus for automatically identifying the various types of protoplasmic cells in body fluids and counting the occurrence of each type in a fluid sample, such as blood or cerebrospinal fluid, as each cell flows past a counting station. The basic concept employed is to use a characteristic of the sub-cellular materials to measure the size of each cell and to facilitate computation of the percentage of the cell occupied by the sub-cellular materials. These quantities are then used to identify the various cells, which have characteristic combinations of cell size and amount of sub-cellular materials.

Now, in accordance with the present invention, it has been discovered that a total count of protoplasmic cells such as leukocytes in blood, and a count of each white blood cell type, as well as blood platelet count, can be quickly and accurately determined by automated means without the use of highly skilled technical personnel who use manual counting techniques.

Specifically, it has been found that the various types of leukocytes, e.g., lymphocytes, monocytes, and granulocytes which include neutrophils, basophils and eosinophils will combine with a fluorescent stain, such as acridine orange. After staining, the nuclear material of these cells, the cytoplasmic granules (as well as the nucleoli and vacuoles) and blood platelets will each exhibit their own characteristic fluorescence when excited with ultraviolet radiation. The corpuscles (white cells or platelets) will emit fluorescent radiation either monochromatically or polychromatically. The lymphocytes, monocytes, and platelets will exhibit primarily monochromatic characteristics, whereas the granulocytes, including neutrophils, eosinophils, basophils, and immature cells, as well as some abnormal cells will fluoresce polychromatically. When stained with a fluorochrome such as acridine orange, and irradiated by a source of radiant energy, the nuclear material of these cells will exhibit specific radiation emmissions in the range of wavelengths from 0.40 to 0.60 microns and the cytoplasmic material from 0.60 to 0.75 microns. Other stains and radiation sources will exhibit emissions in the range of wavelengths from 0.30 to 30 microns provided that the radiation source transmits at wavelengths smaller than the emission wavelengths and that the energy level is sufficient to excite the molecules within the cells.

Further, it has been found that measurement of the time of occurrence of each of the fluorescent emission wavelengths will provide measures of cell diameter and quantity of fluorescent energy emitted by specific portions of the cell. Comparing these values to each other and to the total cell diameter, it is possible to distinguish each of the aforementioned cellular types in a fast, accurate, and automatic manner.

It is an object of this invention to provide a method and apparatus for the rapid, facile, economical and automatic differentation of cells in a fluid sample.

It is a further object of this invention to provide an apparatus that permits the automatic differentiation of the white blood cells in a sample of body fluid.

It is a further object of the invention to provide an automatic apparatus for accurately and effectively determining the percentage amounts of the various types of leukocytes present in a sample of body fluid such as in cerebro-spinal fluid or in blood.

It is a further object of this invention to provide an automatic apparatus that employs ultraviolet energy to cause a secondary fluorescence from a suitably stained sample. The apparatus automatically measures the quantity of fluorescent energy emitted by specific portions of a cell and determines the time of occurrence of these emissions. During the occurrence of a cell the integrated valves of these emissions define the percentage of fluorescence emitted at particular wavelengths. From these percentages and the cell diameter, the device automatically makes a determination of the type of cell. This identity tag is then sequenced to a counting station and then to a reporting station.

According to the present invention, it is not necessary to destroy the erythrocytes (red blood cells) present, as by the use of a lysing agent, since erythrocytes with the exception of reticulocytes, do not exhibit any fluorescent characteristics.

Further, it has been discovered that cells can be identified and counted while in a fluid state by using a flow-through process to cause the cells to pass in single file in front of the beams of radiant energy and photodetectors to measure the fluorescent emissions from discrete parts of the moving cell. Therefore, preparation time for the sample is effectively nonexistent since microscopic slides do not have to be prepared. A typical sample of one cubic millimeter will be analyzed in less than 30 seconds even when using untrained personnel.

BRIEF DESCRIPTION OF THE DRAWINGS

FIGS. 6a to g are representations of the typical leukocytes identified in the example.

DETAILED DESCRIPTION OF THE INVENTION

A fluid sample is taken from a patient and one or more drops of staining solution is added and may or may not be diluted with a buffer solution. The specimen is introduced to a specimen mixing and flow unit which as one embodiment may comprise a tube with an orifice external to the housing. Within the housing, the tube narrows to a smaller diameter, approximately 40 microns, so that the individual corpuscles pass in single file in front of the beam(s) of a source of radiant energy of sufficient intensity to initiate fluorescence. The fluorescent emissions from each cell are detected by photocells through appropriate filters or in another embodiment they are collimated and refracted by a prism or diffraction grating according to the wavelengths of each of the colors emitted. Photodetectors, such as photodiodes or photomultipliers, are positioned to receive the emissions from parts of the cell as it flows by. The wavelength of the emissions are detected and the duration of the emission from each cell at each wavelength is measured. These photoelectric pulses are then used to determine the corpuscle size. The times of occurrence of individual wavelengths are integrated and these values are used as measures of the quantity of nuclear and cytoplasmic fluoresence. Identification of each corpuscle is made by means of logic circuits so that upon identification the correct counter is incremented, as is the total count. When the total count for all leukocytes reaches a preset value of 10,000, or when a fixed amount of fluid (e.g., a cubic millimeter) has been monitored, the counters are stopped and relative percentages for each type computed. The platelet counter functions in a similar manner.

The inventive apparatus is made up of five basic modular components. Each of the five modular units is capable of existing in several modifications without affecting the inventive process. Each of these interchangeable components will be discussed in detail with reference to the figures.

RADIATION SOURCE MODULE

Figure 1:
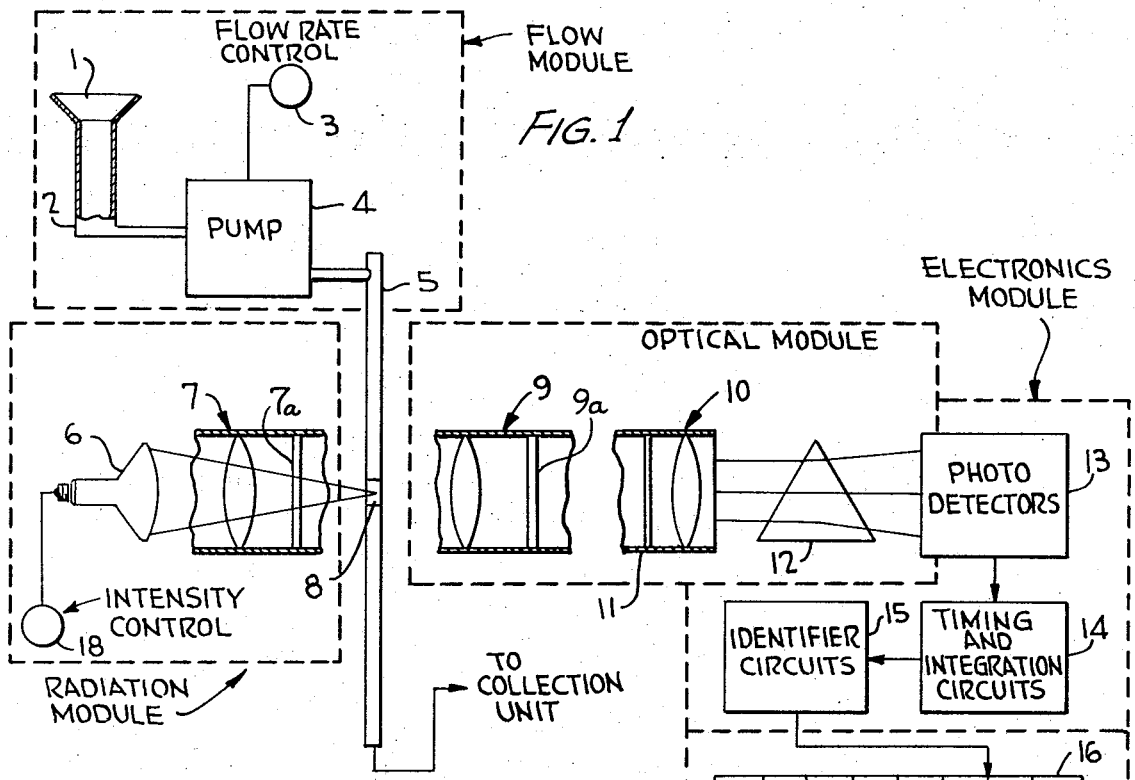
FIG. 1 is schematic drawing of the functional modules of the inventive apparatus and method.

The function of the radiation source module is to produce an intense and narrow beam of energy imaged on the measurement chamber so that the white blood cells are irradiated and caused to luminesce as they pass the module. As shown in FIG. 1 this unit may consist of a mercury vapor lamp 6 for producing an intense source of ultraviolet light. The light from the lamp is collected and collimated by collimator lens unit (7). It is then passed through the filter portion (7a) of lens unit (7) which absorbs the heat and all visible wavelengths and permits the ultraviolet light to pass with minimum attenuation. In the preferred embodiment shown in FIG. 5a the ultraviolet light impinges upon an image forming slit 65 of approximately 0.120 mm × 2.400 mm. This slit 65 is then focused on the measurement chamber 63 by a 60X reducing lens 62 which yields an image 2 microns × 40 microns with the long axis of the slit orthogonal to the axis of capillary tube 5.

There are many possible sources of energy that could be employed to cause the cellular material to luminesce. For example, heat or thermionic emission produced by heating coils or by flames, or by arcs will cause free electrons to move fast enough to escape the molecules. Bombardment of the cellular material with electrons or ions as produced by electron guns or ion accelerators could be employed by having the sample as the target of high energy electron or ion flow but high voltage and/or large magnetic fields in a vacuum would be required to produce sufficient energy levels.

Bombardment by x-rays is theoretically feasible but this source is too large and costly. High energy at a more reasonable level and size than x-rays may be available from laser beams.

Any incandescent light of high intensity which can be focused to provide a sufficient level of energy for absorption by the molecule so that electrons are released to irradiate the cellular material could also be employed, but the preferred radiation source is ultraviolet light, such as produced by mercury-vapor or xenon lamps which can be focused easily and which will radiate primarily in the range of wavelengths from 0.30 to 0.50 microns so as to generate fluorescence from 0.40 to 0.75 microns for various materials.

Secondary fluorescence and phosphorescence produce luminescence by means of the radiation of electromagnetic energy caused by the absorption of higher energy from external radiation sources. If the emission follows the absorption of radiant energy within $10^{-8}$ seconds, it is characterized as a fluorescent emission. If the half-life (decay time to reach one-half of its initial intensity) is greater than $10^{-8}$ seconds, it is characterized as a phosphorescent emission.

Both of these phenomena obey the relationship between the energy of a photon in a beam of electromagnetic radiation and its frequency expressed by the equation:

$$E = h\nu$$

where
E — photon energy
h — Planck's constant
$\nu$ — frequency

If the energy incident on a molecule or atom is at least equal to the difference in energy between the ground state and some excited state of the molecule, the energy will be absorbed and the molecule excited to a higher energy state. Relaxation of the excited molecules results in the electromagnetic radiation of the acquired energy at lower frequencies, corresponding to the energy differences between successive allowable energy states, i.e. the excited states and the ground state.

Fluorescence techniques may be significantly more sensitive than absorption techniques. In absorption spectrometry, the value measured is log (E/E-I).
where
E — energy of incident beam
I — energy absorbed For low concentrations, I is very small and the log ratio approaches zero making it difficult to measure accurately. In fluorescence, direct measurement is made of the emitted radiation. Since the fluorescent radiation occurs at different wavelengths than the exciting radiation, the excitation can be increased to produce measurable fluorescence. A comparison of absorption, fluorescent and phosphorescent spectrometry given by Cetorelli, et al in *Journal of Chemical Education*, Volume 45, 2 (1968) indicates the improved sensitivity of fluorescent techniques. Kallet and Gurkin *Optical Spectra*, Vol. 4, 4 (1970) indicate fluorometric techniques are 1,000 to 10,000 times more sensitive than absorption techniques.

An additional advantage of fluorescence is its specificity. While several materials may absorb energy at similar wavelengths, they may not fluoresce individually but will fluoresce when combined, or they may fluoresce at different wavelengths. Phosphorescence adds another dimension in that the temporal history of the emission may also be used to separate similar wavelength emissions.

THE FLOW MODULE

The flow module in FIG. 1 contains the specimen injection unit, the flow unit and a collection unit. Prior to the injection of the specimen one or more drops of the fluorescent stain is added to a blood collecting tube containing about one milliliter of blood mixed with an anticoagulant. As an example the stock solution of the fluorescent stain is prepared by adding 100 milligrams of acridine orange (a diaminoacridine) to 50 milliliters of ethyl alcohol (ethanol). The sample of blood is poured into the spout 1 shown in FIG. 1 up to the one cubic millimeter (cmm.) level. After mixing and vibrating, the sample is released by a touch valve 2. The sample is drawn through at a rate determined by the setting of the flow-rate control 3 on the pump 4. The fluid is forced into the capillary tube 5 having a diameter of about 40 microns, only slightly larger than the largest cell. The sample is drawn through the tube 5 at a constant velocity. The cells pass in single file into the measurement chamber 8 where each will pass by the U-V focal point. A measured volume of blood, for example one cmm, passing down the tube is used in determining the number of leukocyte types per cmm. A biodegradable wetting agent and detergent with special blood and fat dissolving ingredients is then used to wash the apparatus prior to testing the next specimen. The blood and wash solution empty into a collection unit which can be connected to a drain.

This flow module can be modified by utilizing a variable speed Syringe Pump such as Sage No. 237-1. The Sage Syringe Pump with a Hamilton Syringe has capacities from 0.5 to 1.0 microliters and a flow rate of 0.069 to 1.7 microliters (or cmm.) per minute. Samples would be drawn with the syringe from the standard collecting tube after the fluorescent stain has been added. The loaded syringe is then placed on the "Sage" pump. A switch is thrown and 30 seconds or less later cell count is completed. Adjustable and dual units are also available. A dual unit could serve to hold a larger syringe of cleanser to wash out the flow unit after each trial.

Another modification is the use of a Manostat Micropipette. This liquid dispensing device utilizes a micrometer drive coupled to a direct reading digital counter. The digital counter would be electrically connected to the recorder module to provide accurate volume measurements. The micropipette is filled in a manner similar to syringes and gives highly accurate direct readings of volume dispensed. The readings are accurate to 0.1 percent of dispensed volume.

Instead of using a fixed tube or expensive hypodermic syringe, a disposable syringe could be used for each sample. The specimen is drawn from its collecting container with the disposable syringe and the specimen is injected into the mouth of an automatic feed pipette. The pipette is graduated so as to allow for exact measurement. The pipette feeds the measurement chamber a calibrated portion of the sample. The operator initiates the measurement process by pushing a button which turns on the pump. The specimen is drawn through the pipette and is measured as an exact amount. Upon completion of measurement, the pipette is cleansed for the next trial.

Instead of using a pump to draw the specimen into and through the narrow diameter testing column or chamber, compressed air from a pump within the system of from a compressor external to the system can be used to push the specimen through.

OPTICAL MODULE

Figure 4:
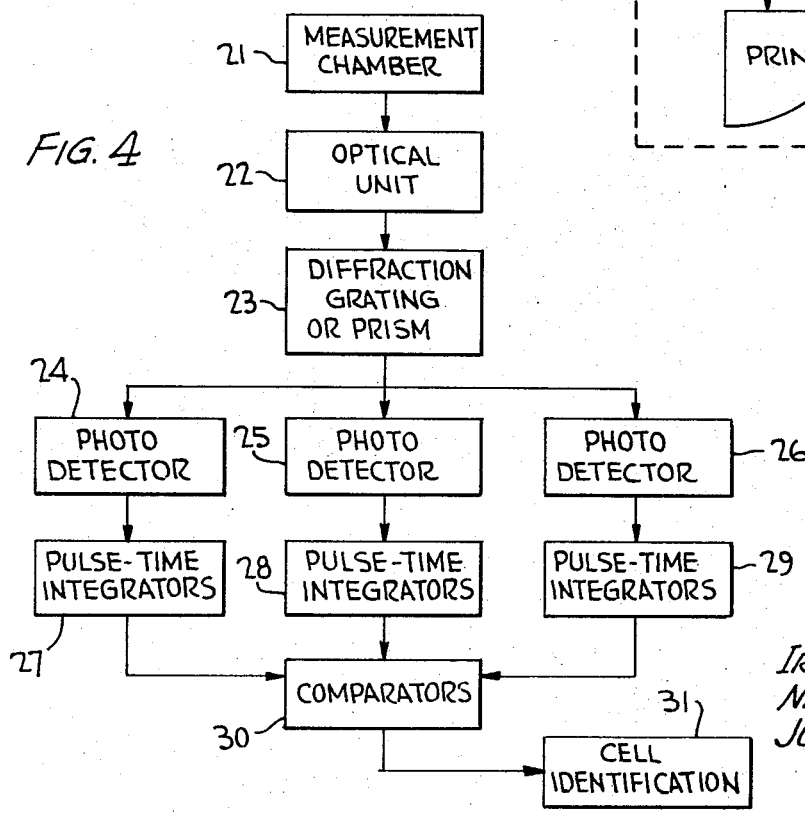
FIG. 4 is a flow chart of the process employed after the blood sample (which has been treated to enhance secondary fluoresence) has begun to flow through the measurement chamber.

The optical module shown in FIG. 1 contains a set of lenses 9 similar to those employed in a standard biological microscope to magnify the image of a fluorescing cell, and a filter (9a) to block out the U-V radiation and to pass the fluorescing wavelengths. A lens 10 in FIG. 1 is used to collimate the emitted radiations on to a diffraction grating or a prism 12. The individual wavelengths will be refracted through specific angles by this prism 12. Photodetectors 13 will be physically located to detect the discrete wavelengths. The output of each of the photocells 13 is amplified and then passed to the electronics module where the signals are processed to extract the characteristics which identify the various types of cells in the fluid sample. A flow chart of this process is shown in FIG. 4. Digital counters 16 receive the identification signals and increment the cell type counters as well as a total cell counter. Electronic circuits do a mathematical conversion of individual cell type count to total cells counted to compute the percentage of each cell type for output onto the printer 17.

Figure 2A:
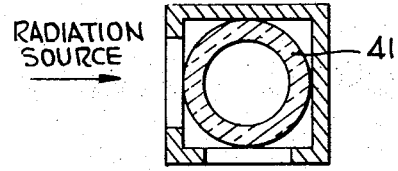
FIGS. 2a, b and c are three views of the measurement chamber.
Figure 2B:
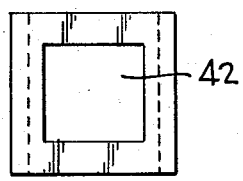
Figure 2C:
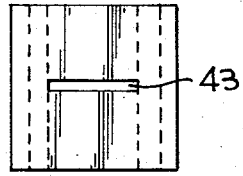
Figure 3:
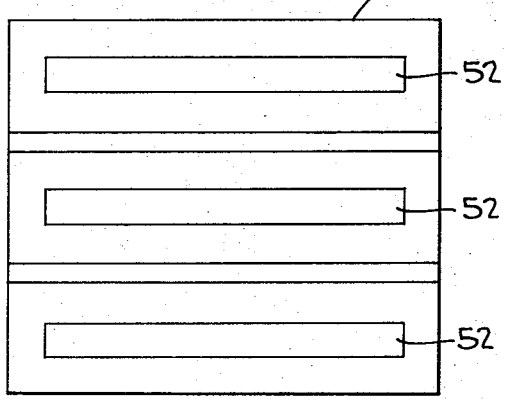
FIG. 3 is a view of the photodetector assembly.

An enlarged diagram of the slit openings in the measurement chamber is shown in FIG. 2. FIG. 2a is a top view showing the measurement tube 41 which is made of quartz to allow passage of U-V radiation from the source. A large aperture 42 is used in this example to irradiate the entire cell(s) in view. The single slit 43 through which the fluorescent emissions pass in narrow (about 2 by 40 microns). The fluorescent emissions which have been refracted by the prism will appear as three parallel bands 52 on the side of the photodetectors 51 as shown in FIG. 3. The detectors 51 are designed and located to match the physical position of each primary discrete wavelength band for the energy emitted by the cells as they return to their standard state.

Since the source of fluorescent radiation is the cell itself, the energy will be radiated in all directions thereby approximating a point source of light. Apertures can be located at any position in the horizontal plane of the U-V source, except of course where the source itself is located. The radiation could also be detected at some distance above and below this plane but the best location for the apertures will be the three mutually perpendicular positions in the horizontal plane of the U-V source.

Figure 5A:
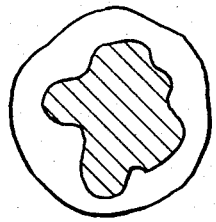
FIGS. 5a and b are schematic diagrams of another electro-optical sensor system that could be employed.
Figure 5A:
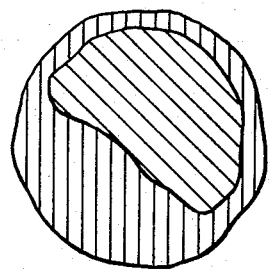
Figure 5A:
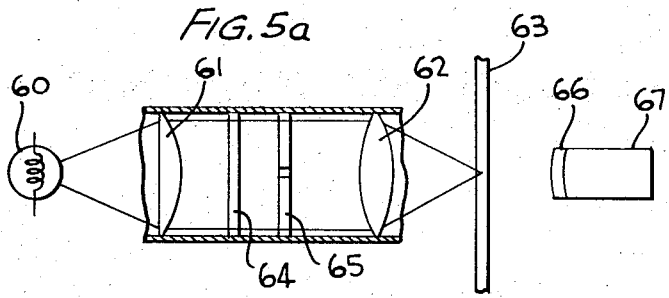
Figure 5B:
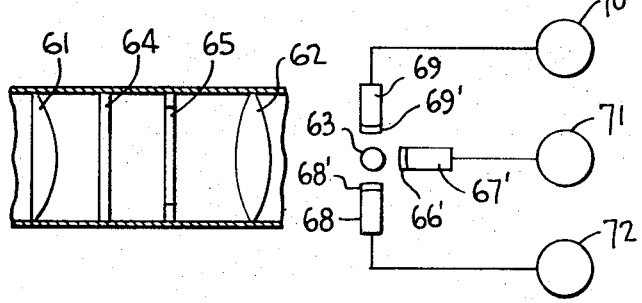
Figure 6A:
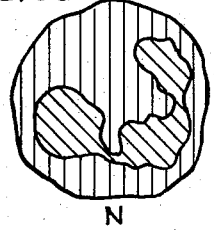
Figure 6B:
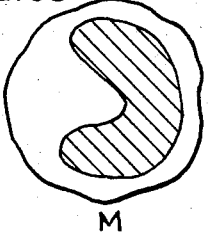
Figure 6C:
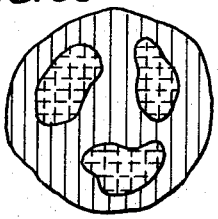
Figure 6D:
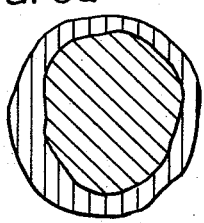
Figure 6G:

Modifications of the optical module replace the prism 12 in FIG. 1 with filters and provide for additional and larger apertures for the fluorescent emissions. In FIG. 5a, a side view of the measurement chamber, the source 60 produces ultraviolet rays which pass collecting lens 61, filter 64, slit 65, and ultimately focusing lens 62 where the slit 65 is imaged directly onto the center line of capillary 63 as an extremely thin slit of approximately 2 × 40 microns. The emitted radiations pass through filters 66', 68' and 69' before being detected by each of the three photodetectors. (Only one photodetector 67 is shown in FIG. 5a.) The top view of the measurement chamber is shown in FIG. 5b, where the photodetector module consists of three photocells 67, 68, and 69 and their respective filters 66', 68', 69'. The photocells and filters are placed as close to the measurement tube 63 as possible so as to subtend the maximum solid angle of fluorescent emission from the sample cells. The filters are transmission filters for green 69', yellow 68', and red 67'. By utilizing physically small photocells they may be placed in the immediate proximity of the source thereby collecting a more significant fraction of the fluorescent energy and avoiding the necessity for collection optics. The required definition for scanning the blood cell is provided by focusing the slit 65 in the radiation source module to the desired resolution width by means of lens 62. The fluorescent emissions from the irradiated element of the cell may then be collected without imaging optics and at no loss in cell element resolution. This is the preferred embodiment.

In alternate embodiments each of the three horizontal slits may be divided into a number of smaller apertures. The minimum size aperture currently contemplated in 1.0 micron wide by 1.0 micron high. The apertures would be spaced one micron apart so that a maximum of the 25 apertures can be located in place of each horizontal slit. To detect the emissions from each aperture of the assembly a simple scanning, convex lens and photodetector assembly could be used to sequentially scan each aperture. Alternatively, the image of the aperture assembly as seen through a fixed lens or mirror could be scanned.

A further alternate embodiment is to locate multiple photodetectors and filters directly at each pinhole of the multiaperture. A single mounting of insulated photocathodes can be made into a single assembly to match each pinhole aperture thus producing a new apparatus, an "N-window" photodetector. The outputs of each photocell would be scanned electronically.

These small horizontal apertures scanned individually while the blood is flowing past provide the electronic-logic circuits with a complete picture of every segment of each fluorescing cell. Measurement of time of arrival and departure of each cell when correlated with aperture position can be used to correct for any spherical distortion in the cell shape caused by forcing cells through a narrow orifice. Thus a three dimensional projection of each cell can be developed from the information available in the various apertures. To obtain additional aspects of the cells additional banks of apertures can be located just above or below the primary apertures. Multiple arrays of multiapertures or slits will provide maximum accuracy by means of correlating data from all three sides. Coincidence of small cells such as platelets with regular cells then could be easily determined.

ELECTRONICS MODULE

The function of the electronics module is to process the photocell outputs, distinguish among the various types of blood cells and provide output signals to increment the cell types and total cell counters. Table I lists the various types of blood cells identifiable by this method and the distinguishing characteristics used in this invention to classify these cells. A pictorial representation, FIG. 6, depicts the fluorochrome treated leukocytes when excited by an ultraviolet source. The nuclear material of each cell combines with the stain to radiate green or yellow secondary fluorescence emissions when irradiated by ultraviolet light. The cytoplasmic granules of each cell combine with stain to radiate red secondary fluorescence emissions when irradiated by ultraviolet light. The three color bands are individually detected by means of photodetectors 24, 25, 26 as shown in FIG. 4.

Figure 7A:
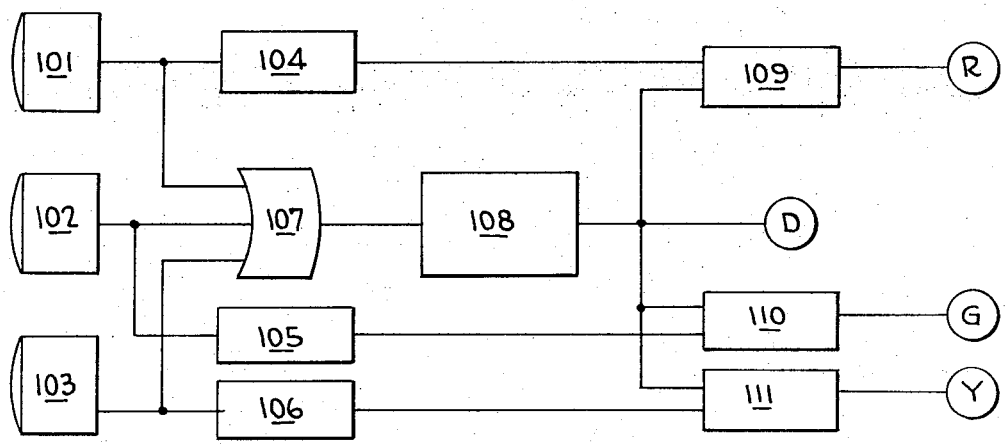
FIGS. 7a to d are cell identification circuits.

The individual outputs from the three detectors 101, 102, 103 are each integrated and converted into color quantity pulses by signal forming circuits 104, 105, 106 illustrated in FIG. 7a. The appearance of any output from the photodetectors represents the start or finish of a fluorescent emission within the bandpass of the filter. These outputs will define the time interval and level of intensity that a part or the whole of the corpusclar area was radiating a specific wavelength. The OR gate 107 is associated with pulse generator 108 which is synchronized with the flow rate and will measure the time that the entire cell is in the field to derive cell diameter D. The individual color quantity pulses are combined with cell diameter D in variable pulse amplitude generators 109, 110, and 111 to provide the precentage of fluorescent energy (from red R, yellow Y, or green G filters) emanating from each cell. In FIG. 7d identifier logic circuits compare each percentage color level and cell diameter D to identify each cell type since these factors provide the primary distinguishing characteristics. (See Table I of Cell Characteristics.)

TABLE I

FLUORESCENT EMISSION CHARACTERISTICS OF STAINED BLOOD CELLS SUPERVITALLY

| Type of Cell | Fluorescent Diameter (Microns) | Percentage of Color Emitted | | |
|---|---|---|---|---|
| | | Green | Yellow | Red |
| Lymphocyte (L) | 7–15 | >25% | <25% | <10% |
| Monocyte (M) | 16–20 | >25% | <25% | <25% |
| Neutrophil (N) | 10–15 | >25% | <25% | >25% |
| Eosinophil (E) | 10–15 | <25% | >25% | >25% |
| Basophil (B) | 10–15 | >25% | <10% | 10–25% |
| Platelet (P) | 1–5 | 0 | 0 | >50% |
| Lymphoid Abnormal | 20 | >25% | <25% | <25% |
| Granulocytic Abnormal | 15 | >25% | <25% | >25% |
| Reticulocyte | 5–10 | 0 | 0 | >25% |

Figure 7B:
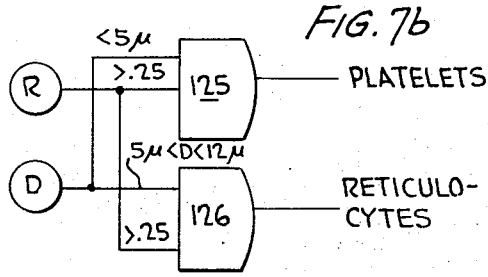
Figure 7C:
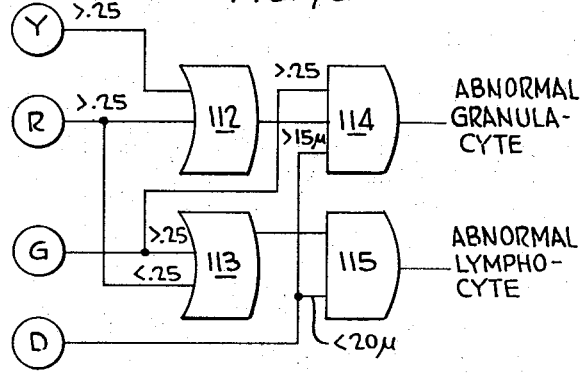
Figure 7D:
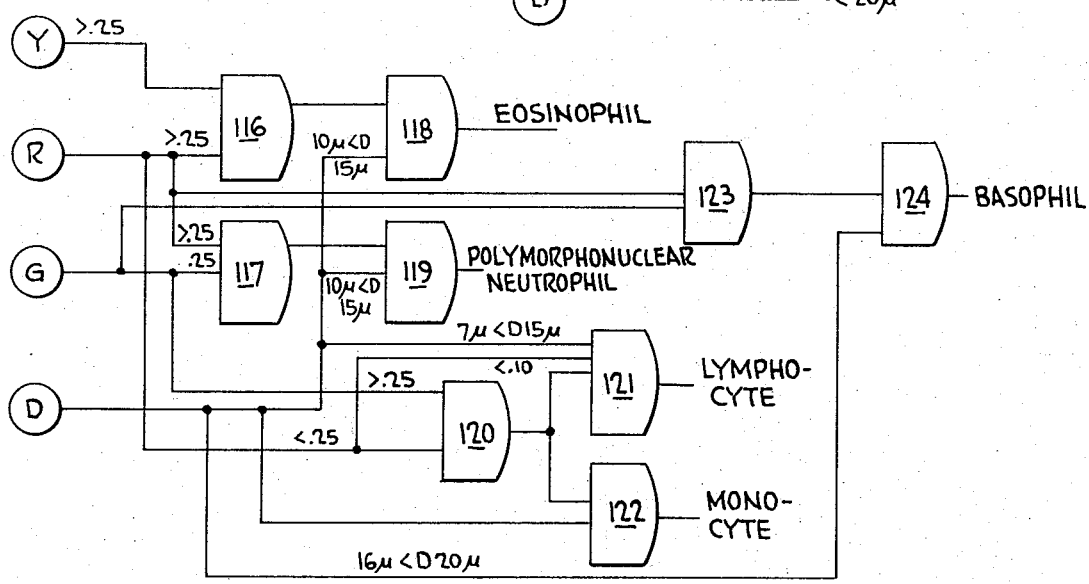

Typical logic circuits performing the identification are shown in FIGS. 7b & c. The characteristics of Table I are used as decision levels to aid in identifying the various cells. In FIG. 7c OR gate 112 and AND gate 113 receive the pulses generated by pulse generators 109, 110, and 111 and function to separate monochromatic lymphoid cells from polychromatic granulocytic cells. Abnormals for each type are identified on the basis of cell diameter by means of AND gate 114 and 115. A monochromatic cell is one in which only one color exceeds 25 percent of the sum of all other colors and any other color is less than 25 percent. A polychromatic cell is one which two or more colors each individually exceed 25 percent. The decision rules followed by all of the identifier logic circuits are shown in Table I, which describes the individual cell characteristics in empirical terms.

Monochromatic cells are either lymphocytes, monocytes, reticulocytes, or platelets. The indication that a monochromatic cell exists when combined with the cell diameter will be applied to the logic circuits 120, 121, 122, 125, and 126 to determine whether a lymphocyte 121, a monocyte 122, a reticulocyte 126, or a platelet 125 has appeared in the measurement chamber. A lymphocyte is identified as being both monochromatic green and between 7 and 15 microns in diameter. A monocyte is identified as being monochromatic green and between 16 and 20 microns in diameter. A reticulocyte is monochromatic red and between 5 and 10 microns in diameter. A platelet is identified as being monochromatic red and under five microns in diameter.

The polychromatic cells will be either neutrophils, eosinophils, or basophils. Eosinophils are readily identified on the basis of being more than 25 percent yellow and more than 25 percent red. Basophils are identified on the basis of having a lesser quantity of red in their fluorescent area than neutrophils as shown in Table I. This, together with a diameter size between 10 and 15 microns, identifies each basophil. A neutrophil is identified as having more than 25 percent green and more than 25 percent red fluorescent areas and being between 10 and 15 microns in diameter.

OUTPUT MODULE

In FIG. 1, the output module is shown as containing a small line printer which receives the digital signals from the counters. The total count of white cells and platelets is printed out along with the actual differential count in both number of each type of cell counted and its relative percentage of the total count.

It is obvious that this unit could be a display on a cathode ray tube or merely a digital counter dial for each type of cell or any other of a myriad of commercially available display means.

While the invention has been particularly shown and described with reference to a preferred embodiment thereof, it will be understood by those skilled in the art that various changes in form and details may be made therein without departing from the spirit and scope of the invention.

What is claimed and desired to be secured by United States Letters Patent is:

1. The process of differentiating leukocytes in a sample of body fluid comprising the steps of:
  a. Obtaining at least a one cubic millimeter sample of the body fluid;
  b. Treating said sample with a fluorochrome material that will cause radiation of a characteristic wavelength to be emitted from at least one of the sub-cellular materials when subjected to radiation in the range of 0.30 to 30 microns;
  c. Initiating relative movement between the sample and a radiation source which has at least one associated co-planar radiation detection means;
  d. Continuing the relative motion until the complete sample has passed the radiation source and the at least one co-planar radiation detector in a manner so that the leukocytes in a substantial portion of the sample are in a single cellular array as they pass said plane;
  e. Causing said radiation source to irradiate the sample as the leukocytes pass in said single cellular array;
  f. Measuring the overall cell sizes of the cells passing said plane by detecting the initiation of the secondary fluorescent emissions with said radiation detection means and continuing said detection until each cell has passed said plane;
  g. Simultaneously determining the amount of each sub-cellular material present in each cell as it passes said plane by detecting the characteristic radiations being emitted by each sub-cellular material in each cell;
  h. Feeding these determinations for each cell as it passes said plane to a logic means wherein the cell is identified on the basis of total cell size and the relative amounts of sub-cellular material present;
  i. Causing a separate counter for each type of leukocyte to be advanced when a leukocyte of that type is identified by steps;
  j. Repeating steps (e) to (i) to until substantially all of the leukocytes is said sample have passed said plane and have been identified.

2. The method of differentiating cells on the basis of the overall size of the cell and the relative portion of the cell occupied by nuclear and cytoplasmic material comprising the steps of:
  a. Subjecting the cellular material to a treatment that will enhance at least one characteristic of either the nuclear or cytoplasmic material whereby the portion of the cell occupied by the at least one material having an enhanced characteristic can be clearly differientiated from the remaining portions of the cell;
  b. Automatically determining the proportion of the material present that has been enhanced by said treatment;
  c. Determining the total size of the cellular body from the enhanced characteristic thereof;
  d. Automatically identifying the cells by the relationship between the total size as determined in step C and the portion of the cell occupied by the at least one material having an enhanced property;
  e. Displaying at least the cumulative count of each cell type so identified.

3. In the method of claim 2 wherein the step of subjecting the cellular material to a treatment that will enhance at least one physical characteristic of either nuclear of cytoplasmic material comprises the step of staining the cellular material.

4. The method of claim 3 wherein the stain is acridine orange.

5. The method of claim 4 wherein one or more drops of a solution consisting of 100 milligrams of acridine orange per 50 milliliters of ethyl alcohol is added to a one milliliter sample of blood mixed with an anticoagulant.

6. The method of differentiating cells on a basis of maximum cross-sectional area of the cell and the relative proportion of the cell occupied by nuclear or cytoplasmic material comprising the steps of:
  a. Subjecting the sample to be studied to a treatment that will enhance at least one characteristic of either the nuclear or cytoplasmic sub-cellular material whereby an area coupled by the at least one material having an enhanced characteristic can be clearly differentiated from other sub-cellular materials of the cell;
  b. Automatically determining the relative areas of the materials that have been enhanced by said treatment;
  c. Determining the overall size of the cellular body from the enchanced characteristic thereof;
  d. Automatically identifying the cells by the relationship between the areas occupied by the nuclear material, the cytoplasmic material and the total cell area;
  e. Indicating at least the number of each cell type identified.

7. The method of identifying white cells comprising the steps of:
  a. Staining a sample of body fluid containing white cells with a stain which will cause characteristic secondary fluoresence from the sub-cellular materials of the white cells;
  b. Directing ultraviolet energy onto a portion of a sample consisting of substantially a single cell;
  c. At a co-planar radiation detection position detecting the characteristic secondary fluorescent emissions from each of said stained sub-cellular materials;

d. Determining the overall size of the cell being identified;

e. Supplying this information to a logic circuit wherein, on the basis of these determinations, the cell is identified.

8. Apparatus for identifying and counting different types of corpuscles which have been stained with a fluorochrome in a sample of body fluid comprising:

means for irradiating at least a portion of the sample of body fluid thereby causing a characteristic secondary emission from each different type of subcellular material in the corpuscles of the fluid sample, said irradiating means being a source of ultraviolet energy; means for detecting the characteristic secondary emissions from the sub-cellular materials in the fluid sample at a plurality of discrete wavelengths whereby the amount of each sub-cellular material in substantially each cell of the fluid sample can be determined while a simultaneous determination of the overall size of the corpuscle is being made; and means for identifying the type of corpuscles on the basis of overall size and the relative amounts of each sub-cellular material present in the corpuscle being identified.

9. The apparatus of claim 8 in which the means for detecting the characteristic emissions from each sub-cellular material is co-planar with said means for irradiating said sample.

10. The apparatus of claim 9 wherein the detection means consists of a photocell.

11. The apparatus of claim 10 wherein the photocell has associated therewith a plurality of filters to permit serial determinations of the discrete wavelengths being emitted by said sample.

12. The apparatus of claim 11 wherein the associated filters are mounted so that they can rotate relative to the single photodetector.

13. The apparatus of claim 12 wherein the single photodetector is a multiaperatured photocell.

14. The apparatus of claim 12 wherein the single photodetector is a solid state device containing a plurality of photosensitive regions.

15. The apparatus of claim 8 wherein the detection means consists of more than one photocell.

16. The apparatus of claim 8 where the detection means consists of multiaperatured photocell.

17. The apparatus of claim 8 wherein the detection means consists of a multiaperatured N-Window photocell.

18. The apparatus of claim 8 wherein the means for detecting the characteristic emissions from the sub-cellular material consists of a plurality of detection means which are mounted relative to each other to permit determination of volumetric relationships between the sub-cellular materials.

19. The apparatus of claim 18 wherein there are three detection means and they are orthogonally mounted.

20. The apparatus of claim 19 wherein each detection means consists of a group of three horizontally disposed slits that are each positioned to receive emissions from the irradiated sample.

21. The apparatus of claim 19 wherein the detection means consists of multiaperatured photocells.

22. The apparatus of claim 21 wherein the detection means consists of a multiaperatured N-Window photocell.

23. The apparatus of claim 18 wherein the detection means consists of a plurality of horizontally disposed slits.

24. The apparatus of claim 23 wherein the detection means comprises a single group of three slits positioned to receive emissions from the irradiated sample.

25. The apparatus of claim 8 wherein the detection means consists of at least one horizontally disposed slit.

26. The apparatus of claim 25 wherein the detection means consists three horizontal slits vertically aligned in the same plane and positioned to receive emissions from the irradiated sample.

27. The apparatus of claim 25 wherein between the irradiated sample and the detection means is disposed a refractive device for separating the characteristic wavelengths being emitted by the sub-cellular material.

28. The apparatus of claim 25 wherein the emission detection means are located at a plurality of levels relative to the plane of the irradiation means.

29. The apparatus of claim 28 wherein the plurality of levels are each located within a band whose center lies in the plane of the irradiation means and the detection means, the width of said band being no greater than the average size of the smallest leukocyte cell.

30. The apparatus of claim 8 including means to cause said sample of body fluid to move in relation to said irradiating means.

31. The apparatus of claim 30 wherein said means moves the fluid sample through a flow chamber that is normally disposed to a plane that passes through the irradiation means.

32. The method of differentiating corpuscles in a sample of body fluid basis of the overall size of the corpuscles and the relative portion of the corpuscle occupied by sub-cellular material comprising the steps of:

a. Subjecting the corpuscles to a treatment that will enhance at least one characteristic of at least one sub-cellular material whereby the portion of the corpuscle occupied by the at least one sub-cellular material having an enhanced characteristic can be clearly differentiated from the remaining portions of the corpuscle;

b. Automatically determining the proportion of the sub-cellular material present that has been enhanced by said treatment;

c. Determining the total size of the corpuscle;

d. Automatically identifying the corpuscles by the relationship between the total size as determined in step (c) and the portion of the corpuscle occupied by the at least one material having an enhanced property;

e. Displaying at least the cumulative count of each corpuscle type so identified.

33. The process of differentiating leukocytes in a sample of body fluid comprising the steps of:

a. obtaining at least a one cubic millimeter sample of the body fluid;

b. treating said sample with a fluorochrome material that will cause radiation of a characteristic wavelength to be emitted from at least one of the sub-cellular materials when subjected to radiation;

c. initiating relative movement between the sample and a radiation source which has at least one associated coplanar radiation detection means;

d. continuing the relative motion until the complete sample has passed the radiation source and the at least one co-planar radiation detector in a manner so that the leukocytes in a substantial portion of the sample are in a single cellular array as they pass said plane;

e. causing said radiation source to irradiate the sample as the leukocytes pass in said single cellular array;

f. measuring the overall cell sizes of the cells passing said plane by detecting the initiation of the secondary fluorescent emissions with said radiation detection means and continuing said detection until each cell has passed said plane, the detected duration of secondary emissions then being correlated with the rate of relative movement of the cell to determine cell size;

g. simultaneously determining the amount of each sub-cellular material present in each cell as it passes said plane by detecting the characteristic radiations being emitted by each sub-cellular material in each cell;

h. feeding these determinations for each cell as it passes said plane to a logic means wherein the cell is identified on the basis of total cell size and the relative amounts of sub-cellular material present;

i. causing a separate counter for each type of leukocyte to be advanced when a leukocyte of that type is identified by steps (e) to (h);

j. repeating steps (e) to (i) until substantially all of the leukocytes in said sample have passed said plane and have been identified.

34. The method of identifying white cells comprising the steps of:
a. staining a sample of body fluid containing white cells with a stain which will cause at least three different bands of characteristic secondary fluorescence from different sub-cellular materials of the white cells;
b. directing ultraviolet energy onto a portion of a sample consisting of substantially a single cell;
c. at a co-planar radiation detection position detecting the characteristic secondary fluorescent emissions from each of said stained sub-cellular materials;
d. determining the overall size of the cell being identified by measuring the time duration of occurence of the secondary fluorescence;
e. supplying this information to a logic circuit wherein, on the basis of these determinations, the cell is identified.

35. Apparatus for identifying and counting corpuscles in a sample of body fluid comprising:
a. means for irradiating at least a portion of the sample of body fluid thereby causing a characteristic emission having at least three different wavelength bands from different types of sub-cellular material in the corpuscles of the fluid sample;
b. means for detecting the characteristic emissions from the sub-cellular materials in the fluid sample and the relative percentage amounts of the three different wavelength bands whereby the amount of each sub-cellular material in substantially each cell of the fluid sample can be determined while a simultaneous determination of the overall size of the corpuscle is being made; and
c. means for identifying the corpuscles on the basis of overall size and the relative amounts of each sub-cellular material present in the corpuscle being identified.

36. The apparatus of claim 35, wherein said body fluid is moving at a known rate, said corpuscules are stained with a fluorochrome and said means for irradiating is a source of ultraviolet energy, and wherein the three different wavelength bands are red, green and yellow, said cell sixe being determined by said detecting means by measuring the duration of emissions from each cell while said cell is moving at said known rate.

37. The apparatus of claim 35, including a means for moving the fluid sample through a flow chamber that is normally disposed to a plane that passes through the irradiation means.

38. The method of identifying types of cells in a sample of body fluid comprising the steps of:
a. staining a sample of body fluid containing cells with a stain which will cause characteristic secondary fluorescence from different sub-cellular materials of the cells;
b. directing ultraviolet energy onto a portion of a sample consisting of substantially a single cell;
c. detecting the characteristic secondary fluorescent emissions from each of said stained sub-cellular materials;
d. determining the overall size of the cell being identified; and
e. identifying the cell type on the basis of percentage of green, yellow, and red secondary fluorescent emission bands detected, and cell size.

39. The method as defined in claim 38, wherein the sample of body fluid contains white blood cells, and wherein step (e) comprises identifying monochromatic and polychromatic cells by determining whether only one of the colors emitted exceeds about 25% of the sum of the emitted colors, or whether two or more of the colors emitted exceed about 25 percent of the sum of the colors emitted, respectively.

40. The method as defined in claim 39, wherein step (e) further comprises additionally identifying specific cell types within the monochromatic and polychromatic groups on the basis of the specific color and colors which predominate, as well as cell size.

41. The method as defined in claim 39, wherein monochromatic cells are identified as a lymphocyte, monocyte, reticulocyte or platelet, and wherein polychromatic cells are identified as a neutrophil, eosinophil, or basophil.

42. The method as defined in claim 41, wherein the specific cell type is identified substantially in accordance with the following characteristics:

| Type of cell | Fluorescent Diameter (Microns) | Percentage of Color Emitted | | |
|---|---|---|---|---|
| | | Green | Yellow | Red |
| Lymphocyte | 7-15 | >25% | <25% | <10% |
| Monocyte | 16-20 | >25% | <25% | <25% |
| Neutrophil | 10-15 | >25% | <25% | >25% |
| Eosinophil | 10-15 | <25% | >25% | <25% |
| Basophil | 10-15 | >25% | <10% | 10-25% |
| Platelet | 1-5 | 0 | 0 | >50% |
| Lymphoid Abnormal | 20 | >25% | <25% | 25% |
| Granulocytic Abnormal | 15 | >25% | <25% | >25% |
| Reticulocyte | 5-10 | 0 | 0 | >25% |

43. The method as defined in claim 38, wherein the cells are moved at a known rate, and wherein the overall size of the cell being identified is determined by measuring the time duration of occurrence of the secondary fluorescence.

* * * * *

UNITED STATES PATENT OFFICE
CERTIFICATE OF CORRECTION

PATENT NO. : 3,864,571
DATED : February 4, 1975
INVENTOR(S) : IRVING M. STILLMAN, ET AL It is certified that error appears in the above-identified patent and that said Letters Patent are hereby corrected as shown below:

Column 16, line 56,

"Eosinophil    10-15    <25%    >25%    <25%"

should read:

--Eosinophil    10-15    <25%    >25%    >25%--

Column 16, line 57,

"Lymphoid Abnormal    20    >25%    <25%    25%"

should read:

--Lymphoid Abnormal    20    >25%    <25%    <25%--

Signed and sealed this 29th day of April 1975.

(SEAL)
Attest:

RUTH C. MASON
Attesting Officer

C. MARSHALL DANN
Commissioner of Patents
and Trademarks